United States Patent [19]

Nickle

[11] Patent Number: 4,500,964
[45] Date of Patent: Feb. 19, 1985

[54] DIALOG USER ERROR DIAGNOSIS, SEVERITY, AND HELP TECHNIQUE

[75] Inventor: Allen F. Nickle, Euless, Tex.

[73] Assignee: International Business Machines Corporation, Armonk, N.Y.

[21] Appl. No.: 480,420

[22] Filed: Mar. 30, 1983

[51] Int. Cl.[3] .............................................. G06F 9/00
[52] U.S. Cl. ..................................................... 364/300
[58] Field of Search ... 364/200 MS File, 900 MS File, 364/300; 371/29

[56] References Cited

U.S. PATENT DOCUMENTS 4,135,662 1/1979 Dlugos ................................ 364/900

Primary Examiner—Raulfe B. Zache
Attorney, Agent, or Firm—C. Lamont Whitham; James H. Barksdale; John L. Jackson

[57] ABSTRACT

An improvement is disclosed to the conventional field related help facility in an interactive data entry data processing system. The improvement comprises a technique for a detailed analysis of all dialog errors, recommended solutions and predicts the application response if the error is not corrected. This is accomplished by building a data base of extended diagnostic message sets which are uniquely addressed by at least the data entry dialog name and the error bit mask generated by an analysis of data entered by a user. Then at the user's request, the error summary data consisting of an error statement, suggested solutions, and a prediction of what will happen if the error goes uncorrected are presented for all errors detected.

3 Claims, 1 Drawing Figure

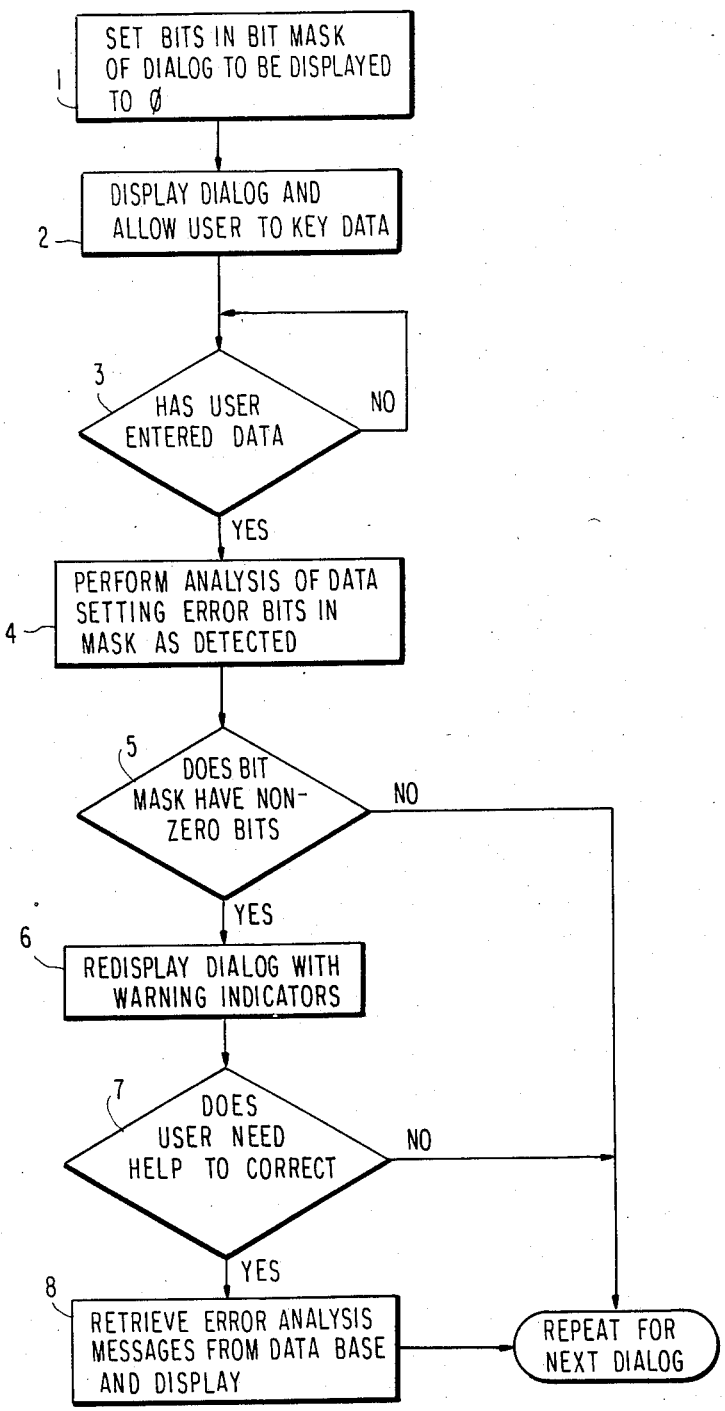

DIALOG USER ERROR DIAGNOSIS, SEVERITY, AND HELP TECHNIQUE

FIELD OF THE INVENTION

The present invention generally relates to interactive data processing systems, and more particularly to a technique which provides for a detailed analysis of all dialog errors, recommended solutions and predicts the application response if the error is not corrected.

BACKGROUND OF THE INVENTION

The change from centralized, batch operation of computer systems to distributed, interactive usage means more users are more directly involved in these systems. Moreover, computer users are becoming more heterogeneous as the usage of computers spreads. The level of experience or knowledge of the users varies widely. More and more, the use of a computer or data processing system is by nonprofessionals in the data processing arts, and it is therefore important that the system be made user "friendly" to facilitate proper data entry and processing.

User "friendly" systems have typically adopted a display screen "menu" or dialog approach which gives the user a choice of several options to perform and/or blanks to fill in. The blanks correspond to data fields, and these data fields may have constraints on the type of character that will be accepted, the length of the field, the compatibility of one entry with another, and so forth. If data not meeting the constraints is entered at the requested locations, the computer will indicate an error. Often, the nature of the error and the way to correct it will be obvious to the user. However, there are many times when the user, when told that his data entry is incorrect, will not be sophisticated enough to be able to recognize the nature of the error or how to correct it.

SUMMARY OF THE INVENTION

It is therefore an object of the present invention to provide a technique to help a user of an interactive computer or data processing system to understand the nature of a data entry error and how to correct it.

It is another object of the invention to provide a technique for a detailed analysis of all dialog errors, recommended solutions and prediction of the application response if the error is not corrected.

The foregoing objects of the invention are accomplished by providing in addition to the conventional field related help facility, an extended diagnostic service. This service analyzes each of the user's inputs and sets bits in an error mask for each error found in keyed fields and errors detected by the interaction of choices made in multiple fields. At the user's request, the error summary data consisting of an error statement, suggested solutions, and a prediction of what will happen if the error goes uncorrected are presented for all errors detected. Diagnosis of this type is especially valuable when the error is more complex than simple typographic or spelling errors.

BRIEF DESCRIPTION OF THE DRAWING

The foregoing and other objects, aspects and advantages of the invention will be better understood from the following detailed description of the invention with reference to the drawing in which the sole FIGURE is a flow diagram showing the process of error analysis.

DETAILED DESCRIPTION OF THE INVENTION

The invention is a technique which displays to the user of an interactive computer or data processing system a statement of an error made, one or more suggested solutions, and the severity of the error if uncorrected. The invention makes use of conventional application analysis of dialog input fields. This application analysis should occur in several layers:
1. Individual keyed data field validity.
2. Interaction of one keyed data field with another.
3. Interaction of keyed data with previously specified data or other application related limits.

The use of the technique according to the invention requires several elements be present:
1. Each dialog image must have a name.
2. Associated with each dialog must be a bit mask containing one bit for each possible detected error type.
3. A data base containing the required error analysis messages indexed by at least dialog name and error number.

A typical flow of the application is illustrated in the drawing to which reference is now made. The process begins in block 1 by first setting all bits in the bit mask of the first dialog to be displayed to zero. Then in block 2, the dialog is displayed and the user is allowed to key in data. Upon a signal from the user such as a signal from the ENTER key, the data keyed by the user is read. The decision block 3 implies that this may be once for each dialog, but in a practical system, it typically would occur after each data field entry in the dialog. When the user keyed data is read, then in block 4 an analysis of the data read is performed in the sequence specified above setting related error bits in the mask as errors are detected. In other words, each time data is read, it is checked for (1) individual keyed data field validity, (2) interaction of one keyed data field with another, and (3) interaction of keyed data with previously specified data or other application related limits. Once this process is completed for each data entry by the user, the bit mask may or may not have one or more bits set to binary 1 indicating one or more errors in data entry for the dialog displayed.

The process as described thus far is conventional and is typical of most currently used data entry applications. At this point in the process, the bit mask is examined to determine if there are any non-zero bits as indicated by decision block 5. If there are, then it is customary to redisplay the dialog with warning indicators, such as error fields in high intensity, as indicated by block 6. This may be enough for the user to recognize the nature of the errors and how to correct them as indicated by the NO output of decision block 7. However, if the user cannot guess what the errors are and how to correct them as indicated by the YES output of decision block 7, then according to the present invention, the dialog name and the bit mask are passed to a program segment which retrieves the detailed error analysis messages from the data base and displays them as indicated by block 8. This process is then repeated for the next dialog and so on until error diagnoses have been presented for each dialog.

The data base from which the error analysis messages are retrieved is made for each dialog with each bit position in the bit mask identifying error messages for each type of error that might be made by a user when keying data into that particularf dialog. Thus, the dialog name and the bit mask uniquely identify one or more error message sets for display to the user.

To further illustrate the procedure, consider the following dialog which requires a user to key in certain basic data for a customer order entry application:

| CUSTOMER OREDER ENTRY APPLICATION | |
|---|---|
| Name | Special Company |
| Address | 401 Any Street |
| City | Big City |
| State | TX |
| Zip Code | 76039 |

Thus, in the example above, the user has keyed in the information shown in bold face and of the five data fields, only the state and zip code data fields have been completely filled. The entries keyed by the user would appear to be correct, yet the error diagnosis procedure has caused a warning indicator to be displayed. Should the user now request diagnostic help, then according to the invention, the following diagnostic help dialog might be displayed:

| EXTENDED DIAGNOSTICS | |
|---|---|
| ERROR | The city you have given does not exist in the state specified. |
| | The zip code indicates that the state name is correct. |
| SOLUTION | Check the invoice to see if the correct city was typed or consult the master customer log for the correct name. |
| SEVERITY | No further processing can occur until this error is corrected. |
| | Return - ENTER    Next error - PF10 |

In the hypothetical example given above, the extended diagnostics clearly tells the user what the error is, how it should be corrected, and whether the error can be ignored. At the end of the extended diagnostics, the user is given the choice of returning to the data entry dialog at which time the error can be corrected, or going to the next error, if any. In other words, the user can make each error correction as indicated by each display of the extended error diagnostics or, after paging through all the extended error diagnostics for a given data entry dialog, making all the required error corrections.

Simply put, the invention provides a data base of error messages which may be uniquely addressed by the data entry dialog name and the bit mask. The program segment which displays the extended diagnostic dialog therefore does not need to be aware nor is it aware of the nature or number of errors to perform its task. The parameter bit mask is scanned one bit at a time for a "1", and the realative number of the "1" bit in the mask is used with the data entry dialog name to build a message ID. Once this message is displayed, if the user requests to see the next error, continued scanning of the mask will allow all detected errors to be diagnosed. Upon return to the data dialog program segment, the bit mask should be set to zero and the user allowed to correct the errors which have been noted before the next analysis is performed.

It is also possible to extend the teaching of this invention to multi-lingual data entry systems where a user may specify a preferred language either on enrolling in the system or on sign on to the system. In this case, the data base would be provided with diagnostic error messages in several different languages, and the address for each of these messages includes in addition to the dialog name and the bit mask, the user's language of choice code.

I claim:

1. In an interactive data entry system of the type wherein a dialog is displayed requiring a user to key in certain specified data and then enter that data, the system then performing an error analysis of the entered data in the sequence of (1) individual keyed data field validity, (2) interaction of one keyed data field with another, and (3) interaction of keyed data with previously specified data or other application related limits and setting related error bits in a mask as errors are detected, and if the error mask has any non-zero bits, then redisplaying the dialog with warning indicators, the improvement of a method of providing an extended error diagnosis of all errors to assist the user in correcting the errors, said method comprising the step of building a data base of extended diagnostic error messages sets for each type of error for each data field of each data entry dialog, each set of extended diagnostic error messages being uniquely addressed in said data base by at least the name of the corresponding data entry dialog and said bit mask.

2. The improvement according to claim 1 further comprising the steps of addressing a set of extended diagnostic messages using a data entry dialog name and said bit mask in response to a user's request for help in diagnosing errors in data entry, and displaying the thus addressed set of extended diagnostic messages.

3. The improvement according to claim 1 wherein said step of building includes the step of providing an error message, a solution message, and a severity message for each set of extended diagnostic error messages.

* * * * *